United States Patent
Ostvik

(10) Patent No.: US 11,964,314 B2
(45) Date of Patent: Apr. 23, 2024

(54) POWDERS COMPRISING SOLID WASTE MATERIALS

(71) Applicant: Ecogensus LLC, Hartford, CT (US)

(72) Inventor: Bjornulf Ostvik, Hartford, CT (US)

(73) Assignee: Ecogensus LLC, West Hartford, CT (US)

( * ) Notice: Subject to any disclaimer, the term of this patent is extended or adjusted under 35 U.S.C. 154(b) by 0 days.

(21) Appl. No.: 17/591,258

(22) Filed: Feb. 2, 2022

(65) Prior Publication Data

US 2022/0241829 A1 Aug. 4, 2022

Related U.S. Application Data

(60) Provisional application No. 63/144,774, filed on Feb. 2, 2021.

(51) Int. Cl.

| | |
|---|---|
| *B29C 64/153* | (2017.01) |
| *B09B 3/24* | (2022.01) |
| *B29C 64/209* | (2017.01) |
| *B29C 64/336* | (2017.01) |
| *B33Y 10/00* | (2015.01) |
| *B33Y 70/10* | (2020.01) |
| *B33Y 40/10* | (2020.01) |

(52) U.S. Cl.
CPC .............. *B09B 3/24* (2022.01); *B29C 64/153* (2017.08); *B29C 64/209* (2017.08); *B29C 64/336* (2017.08); *B33Y 10/00* (2014.12); *B33Y 70/10* (2020.01); *B33Y 40/10* (2020.01)

(58) Field of Classification Search
CPC .................................................. C08K 11/005
See application file for complete search history.

(56) References Cited

U.S. PATENT DOCUMENTS

| | | |
|---|---|---|
| 4,013,616 A | 3/1977 | Wallace |
| 5,312,858 A | 5/1994 | Folsom |
| 5,490,907 A | 2/1996 | Weinwurm et al. |
| 5,571,703 A | 11/1996 | Chieffalo et al. |
| 7,887,726 B1 | 2/2011 | Tsai |
| 9,771,536 B2 | 9/2017 | White |
| 10,618,025 B2 | 4/2020 | Ostvik et al. |
| 11,692,082 B2 | 7/2023 | Ostvik |

(Continued)

FOREIGN PATENT DOCUMENTS

| | | |
|---|---|---|
| CN | 108033721 A | 5/2018 |
| CN | 108658537 A | 10/2018 |

(Continued)

OTHER PUBLICATIONS

[No Author Listed] [online], "National Overview: Facts and Figures on Materials, Wastes and Recycling," EPA.gov, available on or before May 27, 2018, retrieved on Apr. 11, 2022, retrieved from URL <https://www.epa.gov/facts-and-figures-about-materials-waste-and-recycling/national-overview-facts-and-figures-materials>, 16 pages.

(Continued)

*Primary Examiner* — Christopher T Schatz

(74) *Attorney, Agent, or Firm* — Fish & Richardson P.C.

(57) ABSTRACT

Powder compositions containing processed solid waste are provided herein, as are products made from the compositions, and systems and methods for making the compositions and products.

26 Claims, 2 Drawing Sheets

(56) References Cited

U.S. PATENT DOCUMENTS

| | | | |
|---|---|---|---|
| 2011/0272858 A1* | 11/2011 | Tamir | B29C 48/41 |
| | | | 264/319 |
| 2012/0267562 A1 | 10/2012 | Thichy | |
| 2013/0324677 A1* | 12/2013 | Clark | B29C 48/2552 |
| | | | 528/308.1 |
| 2016/0185665 A1 | 6/2016 | Al-Aqeeli et al. | |
| 2018/0319066 A1 | 11/2018 | Tamir | |
| 2019/0211279 A1 | 7/2019 | Ginn et al. | |
| 2019/0233638 A1* | 8/2019 | Zhang | C08J 5/046 |
| 2019/0241679 A1* | 8/2019 | Hallett | C08B 1/003 |
| 2019/0308159 A1* | 10/2019 | Ostvik | C10L 5/445 |
| 2019/0337850 A1 | 11/2019 | Ali et al. | |
| 2020/0181016 A1 | 6/2020 | Ali et al. | |
| 2020/0255629 A1 | 8/2020 | Sahajwalla et al. | |
| 2020/0263005 A1 | 8/2020 | Tamir | |
| 2021/0002173 A1 | 1/2021 | Lee et al. | |
| 2021/0163745 A1 | 6/2021 | Riebel et al. | |
| 2021/0179852 A1 | 6/2021 | Nystrom | |
| 2021/0308533 A1 | 10/2021 | Ginn et al. | |
| 2021/0340064 A1 | 11/2021 | Steinmuller et al. | |
| 2023/0250261 A1 | 8/2023 | Ostvik | |

FOREIGN PATENT DOCUMENTS

| | | |
|---|---|---|
| CN | 109553345 A | 4/2019 |
| CN | 107572936 B | 1/2020 |
| CN | 110818347 A | 2/2020 |
| CN | 109678432 B | 8/2021 |
| DE | 2615610 | 2/1983 |
| EP | 2789593 | 10/2014 |
| JP | 2005179163 A | 7/2005 |
| KR | 100602441 B1 | 7/2006 |
| KR | 10-1706116 | 2/2017 |
| WO | WO 2008/020768 | 2/2008 |
| WO | WO 2010/082202 | 7/2010 |
| WO | WO 2015/173806 | 11/2015 |
| WO | WO 2019/106699 | 6/2019 |
| WO | WO 2019/177193 | 9/2019 |
| WO | WO 2020/188567 | 9/2020 |
| WO | WO 2020/222221 | 11/2020 |
| WO | WO 2021/009815 | 1/2021 |

OTHER PUBLICATIONS

Gu et al., "Use of recycled plastics in concrete: A critical review," Waste Management, Mar. 9, 2016,51:19-42; p. 20 col. 2 para 2, table 1.

Ohijeagbona et al., "Development and characterization of wood-polypropylene plastic-cement composite board," Case Studies in Construction Materials, Apr. 20, 2020, 13: 1-8.

PCT International Search Report and Written opinion in International Appln. No. PCT/US2022/014972, dated Jun. 14, 2022, 16 pages.

PCT Invitation to Pay Additional Fees in International Appln. No. PCT/US2022/014972, dated Apr. 7, 2022, 3 pages.

Urreaga et al., "Sustainable eco-composites obtained from agricultural and urban waste plastic blends and residual cellulose fibers," Journal of Cleaner Production, Jun. 10, 2015, 108: 377-384.

PCT International Preliminary Report on Patentability in International Appln. No. PCT/US2022/014972, dated Aug. 17, 2023, 9 pages.

PCT International Preliminary Report on Patentability in International Appln. No. PCT/US2022/015002, dated Aug. 17, 2023, 8 pages.

PCT International Preliminary Report on Patentability in International Appln. No. PCT/US2022/015003, dated Aug. 17, 2023, 8 pages.

PCT International Search Report and Written Opinion in International Appln. No. PCT/US2022/015003, dated Apr. 27, 2022, 10 pages.

PCT International Search Report in International Appln. No. PCT/US2022/015002, dated Apr. 27, 2022, 10 pages.

* cited by examiner

POWDERS COMPRISING SOLID WASTE MATERIALS

CROSS-REFERENCE TO RELATED APPLICATIONS

This application claims priority to U.S. Provisional Patent Application No. 63/144,774, filed on Feb. 2, 2021, the content of which is incorporated herein by reference in its entirety.

TECHNICAL FIELD

This document relates to powder compositions containing processed solid waste, products made from the compositions, and systems and methods for making the compositions and products.

BACKGROUND

Management of solid waste from residential, institutional, and commercial sources, as well as agricultural waste and other waste such as sewage sludge, is challenging issue with ever-evolving solutions. As landfills reach and exceed capacity worldwide, and as the solid waste industry and societies generally limit the use of landfills, alternative methods of managing solid waste have been developed to reduce the volume introduced into landfills. Recycling of metals, plastics, and paper products, as well as composting organic matter are relatively common methods of reducing the overall volume of solid waste going to landfills. Waste-to-energy processes are used to convert the heat content inherent in solid waste into a more usable form, such as electricity. For example, some waste-to-energy processes incinerate solid wastes to generate heat and produce steam that drives downstream steam generators. The byproducts of such incineration processes include ash (e.g., fly ash and bottom ash), which also may contain additional unfavorable combustion byproducts (e.g., particulates), glass, and metals, causing the ash to be unsuitable for many reuse applications. Very typically, in a waste incineration process, 15-25% (and sometimes up to one third) of the solid waste, by weight, remains as ash. Almost all incineration ash in the United States is landfilled. In some countries, the ash (primarily bottom ash) is used for road construction.

Alternative methods to reuse solid waste as a resource, rather than landfilling or incineration, is sought worldwide as solid waste generation continues to increase.

SUMMARY

This document is based, at least in part, on the development of methods, materials, and systems for generating powdered compositions from processed mixed wastes, and for using the powdered compositions to generate structural composites, building materials, and other products. For example, the powdered compositions provided herein can be used in the production of sustainable building materials and other products. In some cases, the powdered compositions provided herein can be used in 3D printing processes to yield various products (e.g., building materials). This document provides methods, materials, and systems for processing a mixed solid waste composition. In some embodiments, the mixed solid waste composition is a sorted mixed solid waste composition (e.g., mixed solid wastes from which glass and metals have been removed). The methods described herein can include heating and mixing a solid waste composition, and the pulverizing, crushing, grinding, or otherwise subjecting the processed solid waste composition to forces that will produce a powder. In some cases, the methods provided herein can include combining one or more additives with a heated and mixed solid waste composition (also referred to herein as a "pre-processed" solid waste composition or "pre-processed" raw materials). The one or more additives can include, without limitation, one or more polymers, biocides, flame retardants, and or other additives.

The compositions and methods described herein advantageously provide an eco-friendly structural material alternative to currently available structural materials, such as composite lumber. Composite lumber products may contain wood waste that has been reduced to chip size or ground to a powder form and then combined with one or more adhesives, resins, or other additives before being compressed into a desired form (e.g., particle board or recycled plywood). In some cases, recycled materials such as reclaimed wood or sawdust and recovered plastics are combined to form composite boards. The use of recycled materials for lumber is limited, however, by the fact that the raw material (wood or plastic) must be source-separated. For example, a recycled lumber manufacturer might procure wood "waste" from a lumber mill, where the waste is an already-separated wood by-product of a manufacturing process. If waste plastics are used, they may be a byproduct of an industrial manufacturing process or they may be separated, cleaned and prepared postconsumer waste plastics. In the latter case, the plastics might come from a Materials Recovery Facility, where the processing costs for extracting the plastics from the other wastes and/or separating them by type, cleaning them, and packaging them for re-use by a lumber producer are very high. In these conventional cases, contamination by other materials often found in residential and commercial waste ("municipal solid waste," "rubbish," or "garbage"), such as food waste or other biological materials, is not acceptable. Thus, the majority of municipal solid waste (MSW)—garbage or rubbish coming from residential, commercial and industrial buildings—is placed in landfills worldwide.

The compositions, systems, and methods described herein provide a means for reusing MSW, which can in turn help to mitigate the problematic high use of landfills. The methods described herein can be more cost- and energy-efficient, and provide the ability to efficiently process the inherently heterogeneous contents of solid waste compositions into a raw material suitable for producing sustainable building materials. The compositions and methods provided herein can advantageously use relatively low temperature heat, negative pressure, and mechanical blending to process waste without combustion or incineration. The systems for processing solid waste streams can, in some cases, be installed into existing waste management facilities or used in any other appropriate setting, and represent a community-friendly and synergistic approach to processing and repurposing waste. The methods can optionally include pre-sorting to yield a solid waste composition that is substantially free of glass, metals, and/or rock. In some cases, pre-processing can be conducted at temperatures sufficient to achieve thermolytic reactions for the hemicellulose and cellulose components of the biomass materials, leaving intact the lignin that can contribute to material strength.

In a first aspect, this document features a powder composition containing (a) a solid waste composition that includes organic material and mixed plastics, and (b) water, where the powder composition has an average primary particle size of less than 1600 μm. The solid waste composition can be formed with minimal pyrolysis or independent of pyrolysis. The solid waste composition can have been formed independent of combustion. Thus, the solid waste composition can be substantially free of combustion byproducts. The solid waste composition can be substantially free of fly ash. The solid waste composition can be substantially free of bottom ash. "Substantially free" means the composition contains trace amounts of the material, e.g., less than 0.1 wt. % (e.g., less than 0.01 wt. %, or less than 0.001 wt. %. The composition can include about 0.1 wt. % to about 2 wt. % water, about 1 wt. % to about 3 wt. % water, or about 2 wt. % to about 15 wt. % water. In some embodiments, the composition includes water in an amount less than 3 wt. %. The mixed plastics can include two or more plastics selected from the group consisting of polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethylmethacrylate, polytetrafluoroethylene, and urea-formaldehyde. The solid waste composition can be derived from municipal solid waste, agricultural waste, or both. In some embodiments, the solid waste composition includes unsorted municipal solid waste, unsorted agricultural waste, or both. The powder composition can further include a flame retardant (e.g., a flame retardant selected from the group consisting of phosphate flame retardants, silicon-based flame retardants, metal hydroxide flame retardants, melamine flame retardant, phosphorus-based flame retardants, halogenated flame retardants, brominated flame retardants, polymeric flame retardants, and retardants comprising bio-based chitosan, phytic acid, and/or divalent metal ions). The powder composition can further include a biocide (e.g., a biocide selected from the group consisting of copper azole (CuAz), ammoniacal copper quaternary (ACQ), 4,5-dichloro-2-octyl-isothiazolone, zinc pyrithione, and carbendazim). The powder composition can further include an additive (e.g., recycled plastic or polylactic acid). The powder composition can further include at least one polymer. The polymer(s) can be an additional material not originally included in the mixed solid waste composition but is subsequently added to the mixed solid waste composition to form the powder composition. The powder composition can include about 5 wt. % to about 95 wt. % of the polymer. In some embodiments, the powder composition includes less than 50 wt. % of the polymer. The polymer can include a thermoset polymer. The polymer can include an epoxy resin, a fiberglass-reinforced plastic, a phenolic resin, a polyester resin, polyurethane, a polyurea/polyurethane hybrid, a furan resin, a silicone resin, a vinyl ester, a cyanate ester, a melamine resin, polydicyclopentadiene, a benzoxazine, a polyimide, a bismaleimide, an electrical insulating thermoset phenolic laminate material (e.g., THIOLYTE®), or any combination thereof. The polymer can include a recycled plastic. The polymer can include recycled polyethylene terephthalate (PET), recycled low density polyethylene (LDPE), recycled high density polyethylene (HDPE), recycled polyvinyl chloride (PVC), recycled polyvinylidene chloride (PVDC), recycled polyester (PES), recycled polypropylene (PP), recycled polystyrene (PS), recycled polyamides (PA) (Nylons), recycled polyethylene/acrylonitrile butadiene styrene (PE/ABS), recycled polycarbonate (PC), recycled polycarbonate/acrylonitrile butadiene styrene (PC/ABS), recycled polyurethanes (PU), recycled polyepoxide (Epoxy), recycled polyetheretherketone (PEEK), recycled polyetherimide (PEI), recycled polyimide, recycled polylactic acid (PLA), recycled polymethyl methacrylate (PMMA, acrylic), recycled polytetrafluoroethylene (PTFE), or any combination thereof.

The powder composition can further have a coating that forms an exterior surface of the powder composition. The polymer can be in the form of a coating that coats an exterior surface of the particles of the powder composition. The average primary particle size can be about 100 μm to about 1600 μm. The powder composition can be a construction material. The solid waste composition can include from about 40% wt. %. to about 86 wt. % carbon, from about 3 wt. % to about 20 wt. % hydrogen, oxygen, and less than 5 wt. % water.

In another aspect, this document features a method of making a powder composition. The method can include (a) heating, in a process vessel, a solid waste composition that includes (i) mixed plastics in an amount of about 2 wt. % to about 70 wt. % of the solid waste composition, and (ii) organic materials, (b) melting, in the process vessel, at least a portion of the mixed plastics of the solid waste composition, (c) cooling the solid waste composition, and (d) reducing the cooled solid waste composition to yield a plurality of particles having an average maximum dimension of about 100 μm to about 1600 μm. The cooled solid waste composition can be reduced to yield the plurality of particles having the average maximum dimension of about 100 μm to about 1600 μm, independent of pulverization and milling. The method can further include combining a polymer with the solid waste composition, for example, in the process vessel to form a composite resin. The polymer can include a thermoset polymer. The method can further include adding an additive, a flame retardant, or a biocide to the solid waste composition in the process vessel. For example, the method can include adding an additive, where the additive includes recycled plastic, polylactic acid, or a combination thereof. The method can include adding a biocide, where the biocide includes copper azole (CuAz), ammoniacal copper quaternary (ACQ), 4,5-dichloro-2-octyl-isothiazolone, zinc pyrithione, carbendazim, or any combination thereof. The method can include adding the biocide at a temperature less than 50° C. The method can include adding a flame retardant, where the flame retardant is selected from the group consisting of phosphate flame retardants, silicon-based flame retardants, metal hydroxide flame retardants, melamine flame retardants, phosphorus-based flame retardants, halogenated flame retardants, brominated flame retardants, polymeric flame retardants, and retardants comprising bio-based chitosan, phytic acid, divalent metal ions, and combinations thereof. The method can further include producing a resin comprising the powder composition and a polymer.

This document also features a method of making pellets, where the method includes pelletizing the powder composition described herein.

In another aspect, this document features a composite resin that includes the powder composition described herein and an added polymer. The composite resin can contain about 5 wt. % to about 80 wt. % of the powder composition, about 10 wt. % to about 50 wt. % of the powder composition, or about 20 wt. % to about 40 wt. % of the powder composition. The composite resin can contain about 5 wt. % to about 95 wt. % of the added polymer, about 20 wt. % to about 90 wt. %, about 40 wt. % to about 80 wt. % of the added polymer, or about 50 wt. % to about 70 wt. % of the added polymer. The composite resin can further contain wood by-products or waste products. The composite resin can contain about 0.1 wt. % to about 35 wt. % of the wood by-products or waste products. The wood by-products or waste products can include sawdust.

In another aspect, this document features a method of making a composite material, where the method includes heating or melting a polymer, and combining the powder composition described herein with the heated or melted polymer. The combining can include mixing the powder composition and the polymer. The method can further include, either before or during the combining, heating the powder composition. The method can further include, either before or during the combining, melting a portion of the powder composition. The combining can include fusing at least a portion of the mixed plastics of the powder composition together with the polymer. The polymer can contain a thermoset. The polymer can contain a fast-cure thermoset polymer, a slow-cure thermoset polymer, or a combination thereof.

In still another aspect, this document features a method of manufacturing an object, where the method includes depositing a filament or a stream of the composite resin described herein, or a composite material produced according to the method described herein, into a plurality of layers to form the object.

This document also features an additive manufacturing method for forming an object, where the method includes depositing a stream of the composite resin described herein, or a composite material produced according to the method described herein, to yield a plurality of layers and form the object.

In addition, this document features an additive manufacturing (3D printing) method, where the method includes extruding a first filament or a first stream of material containing the composite resin described herein.

Further, this document features an additive manufacturing method for forming an object, where the method includes depositing a first stream of a first material using a first nozzle. The first material includes a solid waste composition, which includes organic material and mixed plastics in an amount of about 2 wt. % to about 60 wt. % of the solid waste composition. The first material is in the form of a powder having an average primary particle size of less than 1600 μm. The solid waste composition can include unsorted municipal solid waste, unsorted agricultural waste, or both. The first material can further include a first polymer. The first polymer can be combined with the solid waste composition to form a composite resin having an average maximum dimension of about 100 μm to about 1600 μm. The method can further include depositing a second stream of a second material using a second nozzle. The second material can include recycled plastics, the first polymer, a second polymer different from the first polymer, or any combination thereof. The first stream of the first material and the second stream of the second material can be deposited together to yield a plurality of layers to form the object. The first stream of the first material and the second stream of the second material can be alternatingly deposited to yield a plurality of layers to form the object.

Any of these methods can further include extruding a second filament or a second stream of material comprising a filament polymer. The filament polymer can include a thermoset polymer. The filament polymer can contain a fast-cure thermoset polymer, a slow-cure thermoset polymer, or a combination thereof. The first filament or the first stream of material can be formed using a first nozzle and the second filament or the second stream of material can be formed using a second nozzle. The first filament or the first stream of material can be extruded using a first nozzle and the second filament or the second stream of material can be extruded using a second nozzle, where the first filament or the first stream of material and the second filament or the second stream of material yield a plurality of layers that form the object. The method can further include forming a three-dimensional structure, where a first portion of the structure includes the first filament, and a second portion of the structure includes the second filament. The method can further include forming a three-dimensional structure that includes a matrix, where the matrix includes the second filament. The matrix can include a plurality of frames, and the method can further include filling at least a portion of void spaces between the plurality of frames with the second filament. The matrix can include a lattice structure or a honeycomb structure (e.g., a honeycomb structure with square, pentagonal, hexagonal, heptagon, or octagon shaped substructures, or a plurality of prism cylinder structures). Each prism cylinder can have a base and a cap that fully encapsulate the interior of the prism.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
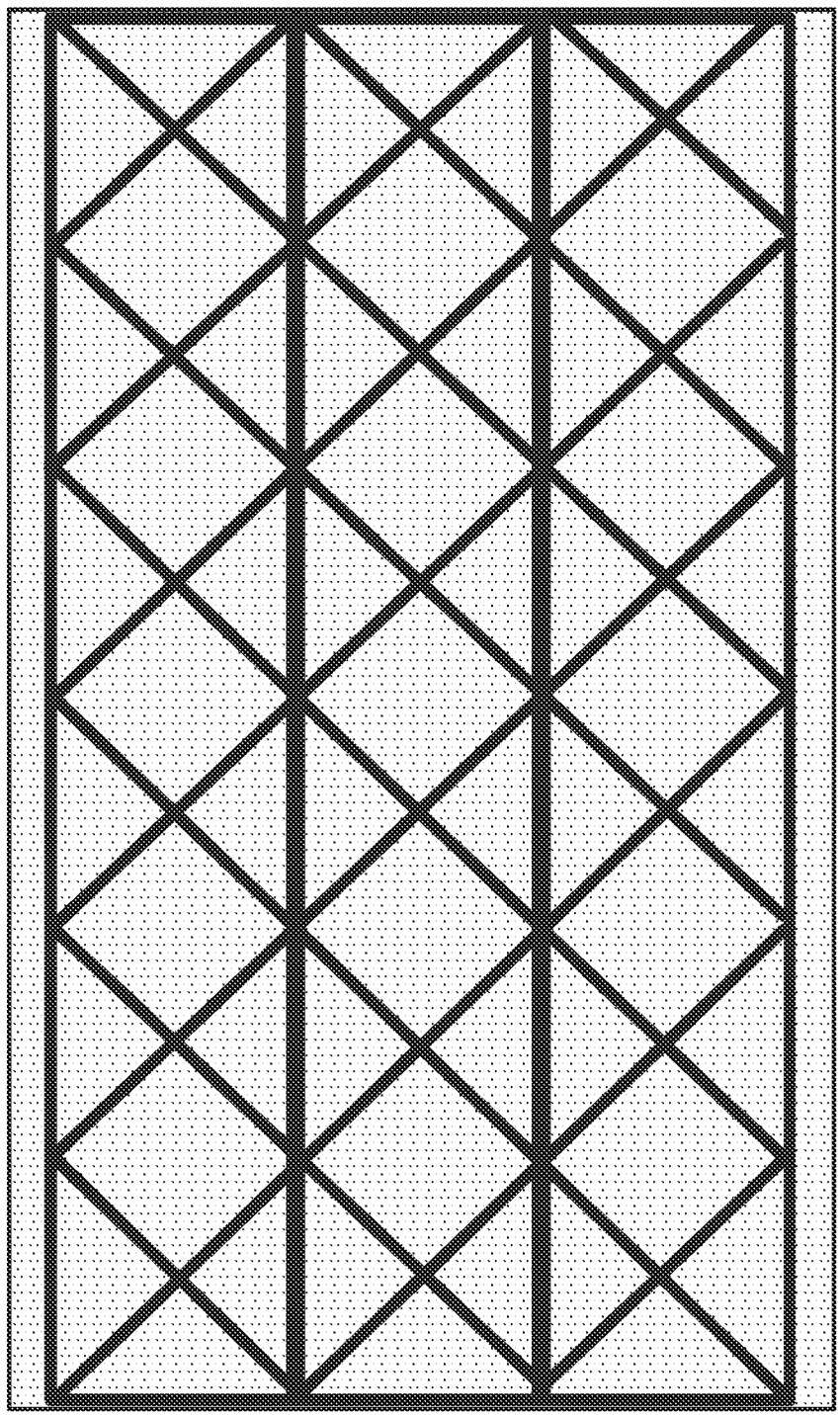
FIG. 1 shows an exemplary 3D printed structure made from a composite resin.

This document provides methods and materials for using typically landfilled waste as a raw material for compositions that may be used, for example, in various sustainable materials and products, including building materials. In particular, this document provides methods, materials, and systems for processing mixed solid waste to generate composites, such as powders and resins, and products comprised of or containing the composites.

In general, the components of a composite produced by the methods provided herein include a solid waste composition. In some cases, a composite can include a solid waste composition and one or more polymers (e.g., one or more "binding polymers"), fillers, biocides, flame retardants, other additives, or any combination thereof. For example, a composite can include a solid waste composition and a polymer. In some cases, the composites provided herein also can include a small amount of water (e.g., less than 2 wt. % water).

The composite provided herein can be in the form of a powder. In some embodiments, the composites provided herein has an average primary particle size of less than 1600 microns (μm) (e.g., less than 1500 μm, less than 1200 μm, less than 1000 μm, less than 750 μm, less than 500 μm, less than 300 μm, less than 250 μm, less than 200 μm, or less than 150 μm). In some embodiments, the composites provided herein has an average primary particle size of about 100 μm to about 1600 μm (e.g., from about 100 μm to about 200 μm, from about 200 μm to about 300 μm, from about 250 μm to about 500 μm, from about 500 μm to about 750 μm, from about 700 μm to about 1000 μm, from about 800 μm to about 1200 μm, from about 1000 to about 1200 μm, from about 1200 μm to about 1400 μm, or from about 1400 μm to about 1600 μm). As used herein, a "primary particle size" refers to the longest linear dimension, e.g., a maximum length or a maximum diameter, of a primary particle. As used herein, a "primary particle" is an individual single particle, not an agglomeration of two or more particles. A primary particle can be visually identified by microscopy and distinguished from agglomerations of two or more primary particles based on size, shape, or both. The average primary particle size can be specified, for example, based on a maximum allowable particle size for an extrusion nozzle (such as a 3D printing nozzle).

In some embodiments, the composites provided herein can be in the form of a resin pellet. In some embodiments, the pellets are provided in discrete shapes, such as cylindrical or spherical shaped pellets. In some embodiments, the pellets has a maximum dimension of about 1 millimeters (mm) to about 10 mm (e.g., from about 2 mm to about 8 mm, from about 3 mm to about 5 mm, less than 10 mm, less than 8 mm, less than 5 mm, or less than 3 mm).

The composites provided herein can include a small total amount of water. In some embodiments, the composites provided herein can have less than 5 wt. % of a total amount of water (e.g., less than 4 wt. %, less than 3 wt. %, less than 2 wt. %, less than 1 wt. %, less than 0.5 wt. %, less than 0.1 wt. %, or less than 0.01 wt. % of a total amount of water). In some embodiments, the composites include about 0.1 wt. % to about 5 wt. % of a total amount of water (e.g., about 0.1 wt. % to about 2 wt. % water, or about 1 wt. % to about 3 wt. % of a total amount of water). In some cases, water acts as a lubricant, for example, in an extruding process (e.g., 3D printing), and it can be advantageous to increase water content in the solid waste composition (such as greater than 2 wt. %). In some embodiments, the composites include greater than 2 wt. % of a total amount of water (e.g., greater than 3 wt. %, greater than 4 wt. %, greater than 5 wt. %, greater than 6 wt. %, greater than 7 wt. %, greater than 8 wt. %, or greater than 9 wt. % of a total amount of water). In some embodiments, the composites include about 2 wt. % to about 15 wt. % of a total amount of water (e.g., about 2 wt. % to about 10 wt. %, about 2 wt. % to about 9 wt. %, about 2 wt. % to about 8 wt. %, about 2 wt. % to about 7 wt. %, about 2 wt. % to about 6 wt. %, about 2 wt. % to about 5 wt. %, about 2 wt. % to about 4 wt. %, about 2 wt. % to about 3 wt. %, about 3 wt. % to about 10 wt. %, about 3 wt. % to about 9 wt. %, about 3 wt. % to about 8 wt. %, about 3 wt. % to about 7 wt. %, about 3 wt. % to about 6 wt. %, about 3 wt. % to about 5 wt. %, about 3 wt. % to about 4 wt. %, about 4 wt. % to about 10 wt. %, about 4 wt. % to about 9 wt. %, about 4 wt. % to about 8 wt. %, about 4 wt. % to about 7 wt. %, about 4 wt. % to about 6 wt. %, about 4 wt. % to about 5 wt. %, about 5 wt. % to about 10 wt. %, about 5 wt. % to about 9 wt. %, about 5 wt. % to about 8 wt. %, about 5 wt. % to about 7 wt. %, about 5 wt. % to about 6 wt. %, about 6 wt. % to about 10 wt. %, about 6 wt. % to about 9 wt. %, about 6 wt. % to about 8 wt. %, about 6 wt. % to about 7 wt. %, about 7 wt. % to about 10 wt. %, about 7 wt. % to about 9 wt. %, about 7 wt. % to about 8 wt. %, about 8 wt. % to about 10 wt. %, about 8 wt. % to about 9 wt. %, or about 9 wt. % to about 10 wt. % of a total amount of water).

Various embodiments of the composites provided herein include a solid waste composition. In some embodiments, the composites provided herein include at least 5 wt. % of the solid waste composition (e.g., at least 10 wt. %, at least 20 wt. %, at least 30 wt. %, at least 40 wt. %, at least 50 wt. %, at least 60 wt. %, at least 70 wt. %, at least 80 wt. %, or at least 90 wt. % solid waste composition). In some embodiments, the composites include about 5 wt. % to about 95 wt. % of the solid waste composition (e.g., about 10 wt. % to about 50 wt. % of the solid waste composition, or about 20 wt. % to about 40 wt. % of the solid waste composition).

"Waste" generally refers to carbon-containing combustible material that has been discarded after its primary use. Waste includes solid waste. Prior to processing, the waste may be wet and heterogeneous, containing a portion of non-combustible waste. "Solid waste" refers to any garbage, or refuse, sludge from a wastewater treatment plant, water supply treatment plant, or air pollution control facility and other discarded material, including solid, liquid, semi-solid, or contained gaseous material resulting from industrial, commercial, mining, and agricultural operations, and from community activities.

A variety of sources of solid waste can be used to produce the composites provided herein. For example, a solid waste mixture can be derived from non-hazardous waste sources including, but not limited to, municipal waste, agricultural waste, sewage sludge, household waste, discarded secondary materials, and industrial solid waste.

"Municipal waste" or MSW may refer to any household waste or commercial solid waste or industrial solid waste. Non-limiting examples of wastes that may be included in the solid waste mixture include biodegradable waste such as food and kitchen waste, green wastes such as lawn or hedge trimmings, paper, mixed plastics, solid food waste, solid agricultural waste, sewage sludge, and automotive shredder residue.

"Household waste" or "residential waste" refers to any solid waste (including garbage, trash, and sanitary waste in septic tanks) derived from households (including single and multiple residences, hotels and motels, bunkhouses, ranger stations, crew quarters, campgrounds, picnic grounds, and day-use recreation areas).

"Commercial solid waste" refers to all types of solid waste generated by stores, offices, restaurants, warehouses, and other nonmanufacturing activities, excluding residential and industrial wastes.

"Industrial solid waste" refers to non-hazardous solid waste generated by manufacture or industrial processes. Examples of industrial solid waste include, without limitation, waste resulting from manufacturing processes such as electric power generation, production of fertilizer and agricultural chemicals, production of food and related products, production of leather and leather products, production of organic chemicals, plastic and resin manufacturing, production of pulp and paper, production of rubber and miscellaneous plastic products, textile manufacturing, production of transportation equipment, and water treatment. The term "industrial solid waste" does not include mining waste or oil and gas waste.

In some cases, a solid waste mixture can contain discarded non-hazardous secondary material, in which case composites produced from those solid waste mixtures may be legally categorized as "non-waste." "Secondary material" refers to any material that is not the primary product of a manufacturing or commercial process, and can include post-consumer material, off-specification commercial chemical products or manufacturing chemical intermediates, post-industrial material, and scrap. Examples of non-hazardous secondary materials include scrap tires that are not discarded and are managed by an established tire collection program, including tires removed from vehicles and off-specification tires, resinated wood, coal refuse that has been recovered from legacy piles and processed in the same manner as currently-generated coal refuse, and dewatered pulp and paper sludges that are not discarded and are generated and burned on-site by pulp and paper mills that burn a significant portion of such materials where such dewatered residuals are managed in a manner that preserves the meaningful heating value of the materials.

"Resinated wood" refers to wood products that contain binders and/or adhesives and are produced by primary and secondary wood products manufacturing. Resinated wood includes residues from the manufacture and use of resinated wood, including materials such as board trim, sander dust, panel trim, and off-specification resinated wood products that do not meet a manufacturing quality or standard.

"Mixed plastics" refer to any combination of synthetic or semi-synthetic organics that are malleable and can be molded into solid objects of diverse shapes, and typically are found in municipal solid waste. Examples of plastics that may be found in a solid waste composition include, without limitation, polyester (PES), polyethylene terephthalate (PET), polyethylene (PE), high-density polyethylene (HDPE), polyvinyl chloride (PVC), polyvinylidene chloride (PVDC, SARAN™), low-density polyethylene (LDPE), polypropylene (PP), polystyrene (PS), polyamides (PA) (nylons), acrylonitrile butadiene styrene (ABS), polyethylene/acrylonitrile butadiene styrene (PE/ABS), polycarbonate (PC), polycarbonate/acrylonitrile butadiene styrene (PC/ABS), polyurethanes (PU), maleimide/bismaleimide, melamine formaldehyde (MF), phenol formaldehydes (PF), polyepoxide (epoxy), polyetheretherketone (PEEK), polyetherimide (PEI, Ultem™), polyimide, polylactic acid (PLA), polymethyl methacrylate (PMMA, acrylic), polytetrafluoroethylene (PTFE), urea-formaldehyde (UF), and any combination thereof.

In some cases, a solid waste mixture can be analyzed to detect different types of contents. Based on the analysis, a municipal solid waste stream can be minimally sorted to remove select waste materials such as, for example, glass, metals (e.g., scrap metal, metal chunks, ferrous metals such as iron, steel, and other iron-containing alloys, and non-ferrous metals that do not contain an appreciable amount of iron), and/or concrete, resulting in a sorted solid waste. In some cases, a solid waste mixture can be analyzed to determine the amount of mixed plastics present therein. To form a composite provided herein, the solid waste mixture can be combined with one or more added polymers in a ratio that is based on the analysis.

The amount of water contained within a solid waste mixture can vary. For example, a mixed solid waste may contain an amount of water ranging from about 10 wt. % to about 60 wt. % (e.g., about 10 wt. % to about 20 wt. %). In some cases, a mixed solid waste can contain at least 10 wt. % water (e.g., at least 20 wt. % water, at least 30 wt. % water, at least 40 wt. % water, or at least 50 wt. % water).

The solid waste composition can contain a combination of mixed plastics, organic material (e.g., organic material from waste products such as municipal or agricultural waste), and water. The solid waste composition can include, for example, components from MSW and/or agricultural waste, as well as any other appropriate waste. The contents of MSW can include:

| | |
|---|---|
| paper/paperboard | 20-30% |
| food | 20-25% |
| plastics | 10-20% |
| wood | 5-15% |
| yard trimmings | 10-20% |
| rubber and leather | 1-5% |
| textiles | 1-10% |
| glass | 1-10% |
| metals | 1-10% |
| misc. inorganic waste | 1-5% |
| other | 1-5% |

In some cases, the MSW is sorted to remove metals, glass, miscellaneous inorganic waste, other materials (such as aggregates, rocks, sand, or other non-combustible materials), or any combination thereof. In some cases, the MSW is sorted to remove PVC, which is often the largest source of chlorine in MSW. For example, the MSW can be sorted to remove unwanted materials by manual sorting (e.g., human-performed sorting), magnetic sorting (e.g., use of magnets to remove ferrous metals), eddy current separation (e.g., use of a magnetic field to remove non-ferrous metals), use of a trommel/screen system, an air classifier, optical sorting (e.g., to identify and remove PVC), or any combination thereof. In some cases, the sorted MSW is shredded prior to processing (e.g., heating and/or mixing) in a process vessel.

In some cases, mixed plastics may not be present in a solid waste composition, or may be present in small amounts (e.g., less than 5 wt. %). In some cases, the mixed plastics can be present in the solid waste composition in an amount from about 2 wt. % to about 100 wt. % (e.g., about 2 wt. % to about 5 wt. %, about 5 wt. % to about 20 wt. %, about 10 wt. % to about 30 wt. %, about 20 wt. % to about 40 wt. %, about 30 wt. % to about 50 wt. %, about 40 wt. % to about 60 wt. %, about 60 wt. % to about 80 wt. %, about 80 wt. % to about 90 wt. %, about 90 wt. % to about 95 wt. %, or about 95 wt. % to about 100 wt. %), such that almost none of the solid waste composition or essentially all of the solid waste composition can be made up of mixed plastics. Any combination of plastics can be included in the solid waste composition. For example, a solid waste composition can include polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethylmethacrylate, polytetrafluoroethylene, urea-formaldehyde, or any combination thereof.

A solid waste composition also can include, for example, from about 40 wt. %. to about 86 wt. % carbon (e.g., about 40 wt. % to about 50 wt. %, about 50 wt. % to about 60 wt. % about 60 wt. % to about 70 wt. %, about 70 wt. % to about 80 wt. % carbon, or about 80 wt. % to about 86 wt. %), from about 3 wt. % to about 20 wt. % hydrogen (e.g., about 3 wt. % to about 5 wt. %, about 5 wt. % to about 10 wt. %, about 10 wt. % to about 15 wt. %, or about 15 wt. % to about 20 wt. % hydrogen), as well as oxygen and less than about 5 wt. % water (e.g., less than about 4 wt. %, less than about 3 wt.

%, less than about 2 wt. %, less than about 1 wt. %, about 0.1 to about 4 wt. %, about 0.5 to about 2 wt. %, about 1 to about 3 wt. %, about 2 to about 4 wt. %, or about 3 to about 5 wt. % water).

In some cases, a composite can include at least one polymer (also referred to as an "added polymer" or a "binding polymer") in addition to the polymers and/or plastics present in the solid waste composition. In some embodiments, the composites provided herein include at least 5 wt. % of one or more polymers (e.g., at least 10 wt. %, at least 20 wt. %, at least 30 wt. %, at least 40 wt. %, at least 50 wt. %, at least 60 wt. %, at least 70 wt. %, at least 80 wt. %, or at least 90 wt. % of the one or more polymers). In some embodiments, the composites include about 5 wt. % to about 90 wt. % of the one or more polymers (e.g., about 40 wt. % to about 80 wt. % of the one or more polymers, or about 50 wt. % to about 70 wt. % of the one or more polymers). In some embodiments, a composite provided herein can include a total amount of plastics (an amount that includes plastic in the added polymer and the solid waste material) that is from about 0.1 wt. % to about 99 wt. % (e.g., about 0.1 wt. % to about 1 wt. %, about 1 wt. % to about 5 wt. %, about 5 wt. % to about 10 wt. %, about 10 wt. % to about 25 wt. %, about 25 wt. % to about 50 wt. %, about 50 wt. % to about 70 wt. %, about 60 to about 70 wt. %, about 70 to about 80 wt. %, about 80 to about 90 wt. %, or about 90 wt. % to about 99 wt. %, greater than 65 wt. %, greater than 70 wt. %, greater than 75 wt. %, greater than 80 wt. %, or greater than 90 wt. %).

Any appropriate added polymer can be included in the composites provided herein. In some cases, the polymer includes a thermoset resin. The inclusion of a polymer, such as a thermoset resin, can increase the structural integrity of the finished product, and can allow continuous hardening of the product when exposed to sun (UV rays) and/or heat. In cases where the polymer is added to a pre-processed raw material (e.g., a heated and mixed solid waste composition), the polymer can, for example, fill spaces within the mixed solid waste composition, which can contribute to a very strong, consistent composite product. Examples of thermoset resins that can be added to a pre-processed raw material include, without limitation, epoxy resins, fiberglass-reinforced plastic, phenolic resins, polyester resins, polyurethanes including elastomeric polyurethanes, polyurea/polyurethane hybrids, furan resins, silicone resins, vinyl ester, cyanate esters, melamine resins, polydicyclopentadiene, benzoxazines, polyimides, bismaleimides, THIOLYTE®, and combinations thereof. In some cases, the added polymer is sourced from mixed plastic waste (e.g., recycled plastics). Examples of recycled plastics that can be added to a pre-processed raw material include, without limitation, recycled polyethylene terephthalate (PET), recycled low density polyethylene (LDPE), recycled high density polyethylene (HDPE), recycled polyvinyl chloride (PVC), recycled polyvinylidene chloride (PVDC), recycled polyester (PES), recycled polypropylene (PP), recycled polystyrene (PS), recycled polyamides (PA) (Nylons), recycled acrylonitrile butadiene styrene (ABS), recycled polyethylene/acrylonitrile butadiene styrene (PE/ABS), recycled polycarbonate (PC), recycled polycarbonate/acrylonitrile butadiene styrene (PC/ABS), recycled polyurethanes (PU), recycled maleimide/bismaleimide, recycled melamine formaldehyde (MF), recycled phenol formaldehydes (PF), recycled polyepoxide (Epoxy), recycled polyetheretherketone (PEEK), recycled polyetherimide (PEI), recycled polyimide, recycled polylactic acid (PLA), recycled polymethyl methacrylate (PMMA, acrylic), recycled polytetrafluoroethylene (PTFE), recycled urea-formaldehyde (UF), and combinations thereof. In some embodiments, the added polymer includes at least one recycled plastic (e.g., at least two recycled plastic, at least three recycled plastic, or at least four recycled plastics). For example, the added polymer includes at least recycled PET, recycled LDPE, and recycled HDPE. As another example, the added polymer includes at least recycled PET, recycled LDPE, recycled HDPE, and recycled PVC. When included in a composite provided herein, a polymer (e.g., a thermosetting polymer) can be added in an amount such that the end product contains from about 5 wt. % to about 95 wt. % (e.g., about 20 wt. % to about 50 wt. %, about 30 wt. % to about 70 wt. %, about 5 wt. % to about 25 wt. %, about 20 wt. % to about 40 wt. %, about 40 wt. % to about 50 wt. %, about 50 wt. % to about 60 wt. %, or about 60 wt. % to about 70 wt. %) of the polymer.

The ratio of polymer to mixed solid wastes in a composite provided herein can be adjusted to meet final desired product specifications, including the desired elasticity and rigidity. In some cases, the solid waste composition and polymer blend ratio can yield a final product with Poisson's ratios similar to hardwood species (e.g., oak, walnut, birch, white ash, black cherry, mahogany, or maple) or softwood species (e.g., cedar, fir, pine, hemlock, larch, redwood, or spruce). In some embodiments, the Poisson's ratios can be from about 0.19 to about 0.489. The Modulus of Elasticity (Young's modulus) in some cases can range from about 7 to 16 GPa, about 5 to 7 GPa, or about 3 to 5 GPa.

In some embodiments, the composites provided herein can include one or more other additives. In some embodiments, the one or more other additives can include wood by-products or waste products. In various embodiments, any one of the composite provided herein can include about 0.1 wt. % to about 35 wt. % (e.g., about 1 wt. % to about 5 wt. %, about 5 wt. % to about 10 wt. %, about 10 wt. % to about 15 wt. %, about 15 wt. % to about 20 wt. %, about 20 wt. % to about 25 wt. %, about 25 wt. % to about 30 wt. %, or about 30 wt. % to about 35 wt. %) of these other additives.

In some cases, the ratio of added polymer to solid waste composition in a composite provided herein can be adjusted to meet desired final product specifications, including desired elasticity and rigidity. In some cases, for example, a composite can have a ratio of solid waste composition to added polymer blend that yields a final product with Poisson's ratios similar to those of hardwood species (e.g., oak, walnut, birch, white ash, black cherry, mahogany, or maple) or softwood species (e.g., cedar, fir, pine, hemlock, larch, redwood, or spruce). In some cases, the amount of polymer added to a solid waste composition can increase the total amount of plastics in the resulting composition product by at least about 5% (e.g., at least about 10%, at least about 15%, at least about 20%, at least about 25%, at least about 30%, at least about 40%, at least about 50%, at least about 60%, at least about 70%, at least about 75%, at least about 80%, at least about 90%, or at least about 100%), as compared to the amount of plastics in the solid waste composition alone.

The composites provided herein can have any appropriate tensile strength, tensile modulus, and/or flexural modulus. In some cases, a composite can have a tensile strength that is at least 5% (e.g., at least 10%, at least 15%, at least 20%, at least 30%, at least 40%, at least 50%, at least 60%, at least 70%, at least 80%, at least 90%, at least 100%, or at least 200%) greater than the tensile strength of the solid waste composition. For example, a composite can have a tensile strength of about 40 MPa to about 150 MPa (e.g., about 40 to about 60 MPa, about 60 to about 75 MPa, about 75 to about 90 MPa, about 90 to about 105 MPa, about 105 to about 120 MPa, about 120 to about 135 MPa, or about 135 to about 150 MPa), particularly in the axial direction for composites that have an elongate configuration, such as planks or boards. In some cases, such as for composites with higher polymer (e.g., thermoset or UV-curing resin) content, a composite can have a tensile strength between about 150 MPa and about 450 MPa (e.g., about 150 to about 250 MPa, about 250 to about 350 MPa, or about 350 to about 450 MPa). In some cases, a composite can have a cross-sectional tensile strength of about 1.5 MPa to about 7 MPa (e.g., about 1.5 to about 2.5 MPa, 2.5 to about 4 MPa, about 4 to about 5 MPa, about 5 to about 6 MPa, or about 6 to about 7 MPa).

In some cases, a composite can have a compressive strength (the ability to hold weight under pressure) that is at least 5% (e.g., at least 10%, at least 15%, at least 20%, at least 30%, at least 40%, at least 50%, at least 60%, at least 70%, at least 80%, at least 90%, at least 100%, or at least 200%) greater than the compressive strength of the solid waste composition. For example, a composite can have a compressive strength of at least 4500 psi (e.g., at least 4800 psi, at least 5000, at least 5500 psi, at least 6000 psi, at least 6500 psi, at least 7000 psi, at least 7500 psi, about 4000 to about 5000 psi, about 5000 to about 6000 psi, about 6000 to about 7000 psi, about 7000 to about 7500 psi, or about 4500 to about 7500 psi).

In some cases, a composite provided herein can have a compressive strength that is comparable to or greater than the compressive strength of a particular type of standard material (e.g., wood or concrete). For example, a composite can have a compressive strength comparable to (e.g., within about 10% greater or less than) the compressive strength of a corresponding sample (a sample of a material having dimensions that are substantially the same as the dimensions of the composite) made from ash, pine, elm, maple, oak, teak, mahogany, or any other particular type of wood. In some cases, a composite can have a compressive strength that is at least 50% greater than the compressive strength of a particular type of material (e.g., a particular type of wood, such as ash, pine, elm, maple, oak, teak, or mahogany).

In some cases, a composite can have a flexural yield strength that is at least 5% (e.g., at least 10%, at least 15%, at least 20%, at least 30%, at least 40%, at least 50%, at least 60%, at least 70%, at least 80%, at least 90%, at least 100%, or at least 200%) greater than the flexural yield strength of the solid waste composition. For example, a composite provided herein can have a flexural yield strength that is about 35 MPa to about 60 MPa or greater (e.g., about 35 to about 40 MPa, about 40 to about 45 MPa, about 45 to about 50 MPa, about 50 to about 55 MPa, about 55 to about 60 MPa, or more than 60 MPa).

In some cases, a composite can have a modulus of rupture that is at least 5% (e.g., at least 10%, at least 15%, at least 20%, at least 30%, at least 40%, at least 50%, at least 60%, at least 70%, at least 80%, at least 90%, at least 100%, or at least 200%) greater than the modulus of rupture of the solid waste composition. For example, in some cases, a composite provided herein can have a modulus of rupture that is about 1.5 MPa to about 50 MPa (e.g., about 1.5 to about 10 MPa, about 10 to about 20 MPa, about 20 to about 30 MPa, about 30 to about 40 MPa, or about 40 to about 50 MPa). In some cases, a composite provided herein can have a modulus of rupture that is about 50 MPa to about 100 MPa (e.g., about 50 to about 60 MPa, about 60 to about 70 MPa, about 70 to about 80 MPa, about 80 to about 90 MPa, or about 90 to about 100 MPa. In some cases, such as when a composite contains a relative high percentage of thermoset and/or UV-curing resin, the modulus of rupture can be greater than 100 MPa (e.g., greater than 150 MPa, greater than 200 MPa, or greater than 300 MPa).

Any suitable methods can be used to determine the compressive strength, the tensile strength, the flexural yield strength, and/or the modulus of rupture of a composite and/or a solid waste composition. For example, compression strength can be measured by American Society for Testing and Materials (ASTM) method D198 (parallel or axial) and ASTM D143 (perpendicular or cross-sectional). Tensile strength also can be measured with ASTM D198. The modulus of rupture, as well as the modulus of elasticity, can be measured with ASTM D4761. In addition, shear strength can be measured with ASTM D143.

In some cases, a composite provided herein can include a carbon fiber or carbon fiber-reinforced polymer, which can enhance one or more attributes of the resulting composite with respect to structural measures. For example, carbon fibers can provide structural reinforcement, such as in a reinforcement layer, during a molding process. Carbon fiber-reinforced products also can have improved tensile strength, modulus of elasticity, and fatigue properties as compared to products made from processed mixed solid wastes alone.

In some embodiments, products can be made, at least in part, from the composite powders or resins described herein. In some embodiments, products can include shaped components made from the composite resins or powders described herein. For example, in some embodiments, the composite products can include injection molded composites. In some embodiments, the composite products can include extruded composites. In some embodiments, composite products described herein can be made, fully or partially, from additive manufactured composites (e.g., 3D printed composites).

FIG. 1 provides a top view of an exemplary lattice-type, multidimensional composite structure that can be made using an additive manufacturing process. In FIG. 1, the black lines represent a matrix structure and the dotted lines represent an interior structure. In some cases, the matrix structure can be made of a thermoset polymer. In some cases, the interior structure can be made, either partially or fully, of the composites described herein (e.g., composite resin). In some cases, the matrix can include a blend of fast and slow cure thermoset polymers. The interior structure can, either fully or partially, include the composites described herein that includes a slow cure thermoset polymer. Use of a fast cure polymer in the matrix would advantageously provide rigidity to the structure and prevent distortion of the product during and after manufacturing. The slow cure polymer, when present in both the matrix and the filler, can advantageously enable fusing of the structural matrix to the filler inside, to provide added structural integrity to the composite structure.

The following sections describe methods and systems for producing the composites provided herein. In some cases, the methods and systems can make use of certain aspects of the processes and systems described in U.S. Pat. Nos. 9,771,536 and 10,618,025, which are incorporated herein by reference in their entirety. For example, the methods and systems described in U.S. Pat. Nos. 9,771,536 and 10,618,025 can be used to form the solid waste composition or to form, in part, the composites provided herein.

The present document provides methods and materials for producing sustainable products (e.g., sustainable building materials) from mixed solid waste streams. In some cases, the methods can include the use of front-end sorting equipment to remove metals, glass, rocks/aggregate, or other undesirable materials from a solid waste stream. For example, magnets can be used to remove ferrous metals, an Eddy Current Separator can be used to remove non-ferrous metals (which also can be removed manually), a Trommel Screen can be used to remove oversized material, and/or an air sorter can be used to remove glass. All other materials, including food waste and other organic material, can remain in the solid waste stream unsorted. The methods can include heating the materials in the solid waste composition in a negative pressure environment, which can have the effect of removing substantially all of the moisture from the solid waste composition and structural composites generated therefrom. Certain components of solid waste can have a high moisture content. For example, food waste can have a moisture content of about 70% and can initially make up a substantial portion of the incoming MSW stream. Removal of substantially all moisture content from the food waste can reduce the significance of its presence. In addition, since the process further brings the material to low torrefaction temperatures, including temperatures at which thermal decomposition of some of the materials (e.g., hemicellulose and cellulose) occurs, the process can act as a thermal pretreatment of the paper, paperboard, textiles, wood, and dry components of the food waste.

Pyrolysis is the super-heating of volatile components of an organic substance, created by heating the substance at a temperature ranging from about 400° F. to about 1400° F. (about 205° C. to about 760° C.) in an oxygen-starved environment. Pyrolysis is a type of thermolysis, resulting in the irreversible thermochemical decomposition of organic material. Pyrolysis involves a simultaneous change of chemical composition and physical phase, where the feedstock is divided into ash, char (such as biochar), synoil (biooil), and syngas (biogas). Pyrolysis differs from combustion (oxidation), where the fuel reacts with oxygen, and hydrolysis, where the fuel reacts with water. The syngas and/or other fluids generated from pyrolysis enable the downstream efficient generators for power production, as opposed to the less efficient steam generators used in conjunction with incineration. The present disclosure provides a solid waste composition that is not pyrolyzed, meaning that it has not been divided into ash, char, synoil, and syngas, as the low torrefaction temperatures do not reach typical pyrolysis temperatures.

In some cases, methods for producing the composites and products described herein can include heating a solid waste composition (e.g., in a process vessel such as a barrel), and melting at least a portion of the plastics contained within the solid waste composition. In addition, a method for making a structural composite can include adding a polymer to the mix. The polymer can be added during or after heating of the solid waste composition, for example.

The methods provided herein can include heating the solid waste composition within a temperature range that is high enough to substantially remove microbes that may be present in the solid waste composition. This can eliminate or reduce the likelihood of degradation of the material and corresponding reduction in structural integrity, which otherwise might result from the presence of viable microbes in the raw material feedstock. Moreover, the use of temperature ranges that allow the plastics content of the mixtures to melt can help to facilitate the distribution of plastics within the solid waste material. In some cases, the methods for producing (e.g., heating and melting) the solid waste composition provided herein can be carried out using a process vessel, such as a process vessel described in U.S. Pat. No. 10,618,025, for example. In some cases, for example, a solid waste composition can be heated to a temperature of about 90° C. to about 300° C. (e.g., about 90° C. to about 110° C., about 160° C. to about 260° C., about 160° C. to about 300° C., about 200° C. to about 240° C., or any combination thereof).

During or after processing (e.g., heating and/or mixing) of a solid waste composition, one or more polymers can be mixed with the solid waste composition. In some cases, for example, a component such as a conveyor, a die, a mold, or a combination thereof can be coupled to an opening in the processing vessel or to a component (e.g., a flange) that serves to narrow the diameter of the system (e.g., by about half, such as from a diameter of about 20 inches to a diameter of about 10 inches). For example, a conveyor (e.g., a shaftless spiral conveyor, a ribbon screw conveyor, or a conventional screw conveyor) can be coupled to an opening (e.g., via a flange) in the barrel in order to move the pre-processed raw material into a mold for forming into a building products. Using a component that is narrower than the barrel can allow the pre-processed raw material to be densified, even if the material is then permitted to expand during a later step (e.g., during movement along a ribbon or shaftless spiral conveyor). The densifying step can be optional, however, and in some cases, the barrel portion can be extended to an attachment that is external to the system, where the attachment has substantially the same diameter as the barrel.

In some cases, the methods provided herein can include introducing one or more additives to a pre-processed (e.g., heated and mixed) raw material before it is formed into a structural composite product. For example, a heated and mixed waste material can be fed from the barrel into a mixing conveyor (e.g., a ribbon screw conveyor or a shaftless spiral conveyor), which can be adapted for introduction of one or more additives. In some cases, the one or more additives can be combined with the solid waste composition at a temperature below the temperature to which the waste material was exposed when it was in the barrel portion of the processor. For example, in some cases, water can be used to cool the pre-processed waste material before or after it is fed into the conveyor.

In some cases, one or more hoppers can be connected to or positioned along the conveyor. Each of the one or more hoppers can contain an additive that can be introduced into the pre-processed raw material as it passes through or along the conveyor. In other cases, the heated and mixed solid waste material can be moved from the barrel into a mixing vessel (e.g., a vertical mixing vessel) so that one or more additives can be are introduced and the material can be blended. Any appropriate additive or combination of additives can be introduced.

For example, one or more polymers (e.g., thermoset resins and/or recycled plastics) can be added to a pre-processed raw material (e.g., a heated and mixed solid waste composition) in any appropriate amount and at any appropriate temperature. Suitable temperatures for adding the one or more polymers to a pre-processed solid waste composition can be less than about 70° C. (e.g., about 40 to about 50° C., about 50 to about 60° C., or about 60 to about 70° C.).

In some cases, one or more additional components can be added to a pre-processed raw material. Examples of suitable additional components include, without limitation, recycled plastics, PLA, and wood waste (e.g., sawdust).

In some cases, one or more biocides can be added to a pre-processed raw material. The inclusion of a biocide can reduce or prevent growth of pathogens (e.g., molds, fungi, bacteria, or yeast) in the products provided herein. Any appropriate biocide or combination of biocides can be added. Examples of suitable biocides include, without limitation, copper azole (CuAz), ammoniacal copper quaternary (ACQ), 4,5-dichloro-2-octyl-isothiazolone, zinc pyrithione, and carbendazim. One or more biocides can be added to a pre-processed raw material at any suitable temperature, such as a temperature less than 50° C. (e.g., about 35 to about 40° C., about 40 to about 45° C., or about 45 to about 50° C.). In some cases, a natural, environmentally-friendly wood sealer, such as tung oil, linseed, or beeswax can be used as an alternative to synthetic biocide treatment.

In some cases, one or more flame retardant materials can be added to a composite for fire-proofing or fire retardation. Examples of suitable flame retardants include, without limitation, phosphate flame retardants, silicon-based flame retardants, metal hydroxide flame retardants, melamine flame retardant, phosphorus-based flame retardants, halogenated flame retardants, and brominated flame retardants. In some cases, polymeric flame retardants, retardant coatings made from bio-based chitosan, phytic acid and divalent metal ions, or other types of ecologically-friendly flame retardants can be used.

After the desired additives have been sufficiently combined with the pre-processed raw material, the combined material can be extruded. In some cases, for example, the combined material can be fed (e.g., via a hopper) into an extruder (e.g., a screw extruder), which can push the combined material through a die to produce an extrudate. In some embodiments, the extrudate can be reduced to a pellet form or a powdered form to form the powder or resin composites described herein.

For example, in some embodiments, a method of making a powder composition (e.g., powder composite) includes heating, in a process vessel, a solid waste composition described herein. The method can include melting, in the same process vessel, at least a portion of the mixed plastics of the solid waste composition. The method can include cooling the solid waste composition. The method can further include reducing the cooled solid waste composition to yield particles having a desired average maximum dimension, as discussed above. The reduction process does not include pulverizing the cooled solid waste composition. In contrast, the method may include granulizing the cooled solid waste composition. For example, the method can include placing the cooled solid waste composition in a rotating drum that includes a sieve. The sieve defines holes with sharp edges. As the drum rotates, the cooled solid waste composition comes into contact with the sieve and reduces in size in response to coming into contact with the sharp edges of the sieve holes. In some implementations, the reduction process can include replacing the sieve with a second sieve that defines holes of a different size. The reduction process is repeated and continued until the cooled solid waste composition has been reduced to yield particles having the desired average maximum dimension, as discussed above. As discussed above, in some embodiments, the method can include combining a polymer (e.g., a thermoset) and/or an additive (e.g., a flame retardant, or a biocide, recycled plastic, PLA) with the solid waste composition in the process vessel.

The resulting powder is sterile, hydrophobic, chemically stable, and/or non-biodegradable. "Sterile" refers to the powder being substantially free of living microorganisms, such as bacteria, fungi, and viruses, after being produced or such organisms being inactivated. "Stable" or "chemically stable" refers to powder not substantially changing its chemical or physical properties or structure upon extended contact with ambient conditions, especially under ordinary storage conditions. The powder is "stable" until it is employed in a process, such as 3D printing. "Non-biodegradable" refers to the powder not degrading or deposing under ordinary biological action, such as rot or composting. As a result, the powder may be stored for extended periods in ordinary storage conditions (such as typical plastic containers used for storing other dry bulk goods).

In some embodiments, the powder composition described herein can be further processed to produce a composite material (e.g., a composite resin). For example, in some embodiments, the composite resin can be made from the powder composition and at least one polymer, e.g., any one or more of the polymers described herein. In some embodiments, the composite resin can be formed into a pellet by applying a method of making pellets that includes pelletizing the powder composition described herein.

In some cases, a method of making a composite material includes heating a polymer and combining the powder composition with the heated polymer. In some cases, a composite material can be made by melting a polymer and combining the powder composition with the melted polymer. In some cases, the combining step includes mixing the powder composition and the polymer. In some cases, either before or during the combining, the powder composition is heated or melted. In some cases, either before or during the combining, a portion of the powder composition is melted. The combining step includes fusing at least a portion of the mixed plastics of the powder composition together with the polymer. In some cases, particles of the powder composition are individually encapsulated by the polymer when the powder composition and the polymer are mixed and/or heated together. For example, the polymer can coat the particles of the powder composition. The coating can form a shell around a portion of or the entire outer surface of a particle. As mentioned above, the polymer can include a thermoset. In some cases, the polymer can include a fast-cure thermoset polymer, a slow-cure thermoset polymer, or a combination thereof. In some cases, curing of the thermoset polymer can be aided by heat being transferred from the heated or melted composite.

Composite products can be made using additive manufacturing methods (e.g., 3D printing) in some cases. For example, in some cases, a 3D structure can be produced by depositing a stream of any one of the composite resins described herein, or a composite material produced according to any of the methods described herein. Deposited streams can yield a plurality of layers to form a desired object.

In some cases, additive manufacturing can be employed to form a three-dimensional structure made, partially or fully, from a composite resin. In some cases, an additive manufacturing (3D printing) method includes extruding a first filament or a first stream of material comprising the composite resin described herein. The method can include extruding a second filament or a second stream of material comprising a filament polymer. Examples of a filament polymer include a thermoset polymer, such as a fast-cure thermoset polymer, a slow-cure thermoset polymer, or a combination thereof. In some cases, the first filament or the first stream of material can be formed using a first nozzle and the second filament or the second stream of material can be formed using a second nozzle. The first filament or the first stream of material can be extruded using a first nozzle and the second filament or the second stream of material can be extruded using a second nozzle, and wherein the first filament or the first stream of material and the second filament or the second stream of material yield a plurality of layers that form the object. In some cases, a first portion of the structure can include the first filament, and a second portion of the structure can include the second filament.

As a first example, the method includes extruding a first stream of material comprising the composite resin described herein. As a second example, the method includes extruding a first stream of material comprising the powder composition described herein using a first nozzle and extruding a filament comprising a filament polymer or a second stream comprising the composite resin described herein using a second nozzle. As a third example, the method includes extruding a first stream of material comprising the composite resin described herein using a first nozzle and extruding a filament comprising a filament polymer or a second stream of material comprising the composite resin described herein using a second nozzle. As a fourth example, the method includes extruding a first filament comprising the composite resin described herein and a first filament polymer using a first nozzle and extruding a second filament comprising the first filament polymer or a second filament polymer different from the first filament polymer using a second nozzle.

A three-dimensional composite structure can include a matrix that provides structural support to the structure. The matrix can be shaped and sized as desired. In some cases, the matrix can composed of multiple frame components. In some cases, the matrix has a lattice structure. In some cases, the matrix includes a honeycomb structure that has square, pentagonal, hexagonal, heptagon, or octagon shaped substructures. In some cases, the honeycomb structure includes a plurality of prism cylinder structures, wherein each prism cylinder comprises a base and a cap that fully encase or encapsulate the interior of the prism. In some cases, the matrix comprises a filament polymer that does not contain the solid waste composition. In such cases, additive manufacturing methods are employed to fill at least a portion of void spaces between the plurality of frames made from the filament polymer. Alternatively, in some cases, the matrix may contain the solid waste composition.

Figure 2:
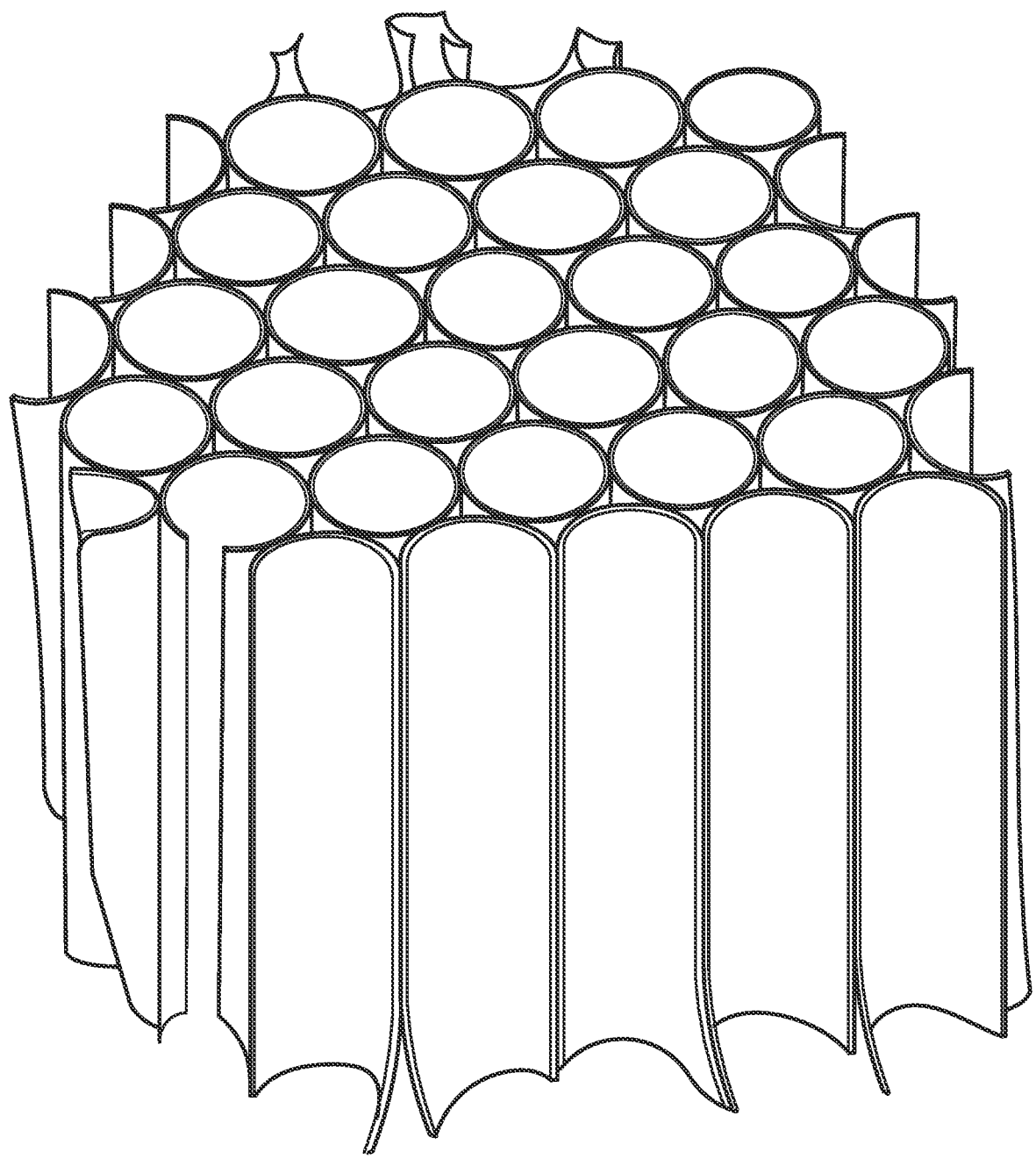
FIG. 2 shows an exemplary three-dimensional composite structure having a matrix composed of multiple frame components that provide a honeycomb structure.

In some cases, the additive manufacturing processing can include multiple nozzles moving in tandem, such that an outer nozzle deposits a thermoset material to form the outer walls of a "cell" while an inner nozzle deposits a material that contains the composites described herein in the inner portions of the cell. The cells together can form the frame (e.g., matrix, skeleton) of the structure. An exemplary structure includes a honeycomb-like structure having walls enclosing interior regions (as depicted in FIG. 2, for example), where the interior regions of each honeycomb cell are filled with the composite-containing material. In some cases, the composite-containing material is enclosed within inside the cell, for example, because each end of the cylinder is capped (e.g., with a thermoset resin). For example, the cylinders can be fused at one end to a base plate (e.g., a polymer plate), thus effectively "capping" a first end of each cylinder. Once filled, a polymer top can be applied to fuse to the tops of the cylinders, forming essentially a top cap over a plurality of cylinders.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of making a powder composition, the method comprising:
   heating, in a process vessel, a solid waste composition in a negative pressure environment, the solid waste composition comprising:
   mixed plastics in an amount of about 2 wt. % to about 60 wt. % of the solid waste composition; and
   organic materials;
   melting, in the process vessel, at least a portion of the mixed plastics of the solid waste composition;
   combining a polymer with the solid waste composition to form a composite resin, wherein a total amount of plastics in the composite resin is greater than 65 wt. %, wherein the composite resin has a tensile strength of about 40 MPa to about 150 MPa;
   cooling the composite resin; and
   reducing the cooled composite resin to yield a plurality of particles having an average maximum dimension of about 100 μm to about 1600 μm.

2. The method of claim 1, wherein the polymer comprises epoxy resin, a fiberglass-reinforced plastic, a phenolic resin, a polyester resin, polyurethane, a polyurea/polyurethane hybrid, a furan resin, a silicone resin, a vinyl ester, a cyanate ester, a melamine resin, polydicyclopentadiene, a benzoxazine, a polyimide, a bismaleimide, THIOLYTE®, or any combination thereof.

3. The method of claim 1, wherein the solid waste composition comprises unsorted municipal solid waste, unsorted agricultural waste, or both, and the cooled composite resin is reduced to yield the plurality of particles having the average maximum dimension of about 100 pm to about 1600 pm independent of pulverization and milling.

4. The method of claim 1, wherein the solid waste composition comprises about 2 wt. % to about 15 wt. % water.

5. The method of claim 1, wherein the solid waste composition comprises less than 3 wt. % water.

6. The method of claim 1, wherein the mixed plastics comprise two or more plastics selected from the group consisting of polyester, polyethylene terephthalate, polyethylene, polyvinyl chloride, polyvinylidene chloride, polypropylene, polystyrene, polyamides, acrylonitrile-butadiene-styrene, polyethylene/acrylonitrile-butadiene-styrene, polycarbonate, polycarbonate/acrylonitrile butadiene styrene, polyurethanes, maleimide/bismaleimide, melamine formaldehyde, phenol formaldehydes, polyepoxide, polyetheretherketone, polyetherimide, polyimide, polylactic acid, polymethylmethacrylate, polytetrafluoroethylene, and urea-formaldehyde.

7. The method of claim 1, wherein the solid waste composition comprises a flame retardant selected from the group consisting of phosphate flame retardants, silicon-based flame retardants, metal hydroxide flame retardants, melamine flame retardant, phosphorus-based flame retardants, halogenated flame retardants, brominated flame retardants, polymeric flame retardants, and retardants comprising bio-based chitosan, phytic acid, and divalent metal ions.

8. The method of claim 1, wherein the solid waste composition comprises a biocide selected from the group consisting of copper azole (CuAz), ammoniacal copper quaternary (ACQ), 4,5-dichloro-2-octyl-isothiazolone, zinc pyrithione, and carbendazim.

9. The method of claim 1, wherein the composite resin comprises about 5 wt. % to about 95 wt. % of the polymer.

10. The method of claim 9, wherein the composite resin comprises less than 50 wt. % of the polymer.

11. The method of claim 9, wherein the polymer comprises epoxy resin, a fiberglass-reinforced plastic, a phenolic resin, a polyester resin, polyurethane, a polyurea/polyurethane hybrid, a furan resin, a silicone resin, a vinyl ester, a cyanate ester, a melamine resin, polydicyclopentadiene, a benzoxazine, a polyimide, a bismaleimide, THIOLYTE®, or any combination thereof.

12. The method of claim 9, wherein the polymer comprises recycled polyethylene terephthalate (PET), recycled low density polyethylene (LDPE), recycled high density polyethylene (HDPE), recycled polyvinyl chloride (PVC), recycled polyvinylidene chloride (PVDC), recycled polyester (PES), recycled polypropylene (PP), recycled polystyrene (PS), recycled polyamides (PA) (Nylons), recycled polyethylene/acrylonitrile butadiene styrene (PE/ABS), recycled polycarbonate (PC), recycled polycarbonate/acrylonitrile butadiene styrene (PC/ABS), recycled polyurethanes (PU), recycled polyepoxide (Epoxy), recycled polyetheretherketone (PEEK), recycled polyetherimide (PEI), recycled polyimide, recycled polylactic acid (PLA), recycled polymethyl methacrylate (PMMA, acrylic), recycled polytetrafluoroethylene (PTFE), or any combination thereof.

13. The method of claim 9, wherein the polymer is in the form of a coating that coats an exterior surface of the solid waste composition.

14. The method of claim 1, wherein an average primary particle size of the plurality of particles is about 100 μm to about 1600 μm.

15. The method of claim 1, wherein the solid waste composition has been formed independent of pyrolysis, combustion, or both.

16. The method of claim 1, wherein the solid waste composition comprises from about 40% wt. % to about 86 wt. % carbon, from about 3 wt. % to about 20 wt. % hydrogen, oxygen, and less than 5 wt. % water.

17. The method of claim 1, further comprising adding a biocide to the solid waste composition at a temperature less than 50° C., wherein the biocide is selected from the group consisting of copper azole (CuAz), ammoniacal copper quaternary (ACQ), 4,5-dichloro-2-octyl-isothiazolone, zinc pyrithione, and carbendazim.

18. The method of claim 1, wherein the composite resin comprises about 5 wt. % to about 80 wt. % of the solid waste composition.

19. The method of claim 1, wherein the composite resin comprises about 0.1 wt. % to about 35 wt. % of wood by-products or waste products.

20. The method of claim 19, wherein the wood by-products or waste products comprise sawdust.

21. The method of claim 1, further comprising forming the plurality of particles into a resin pellet having a maximum dimension of about 1 millimeter (mm) to about 10 mm.

22. The method of claim 1, wherein the composite resin comprises a carbon fiber or carbon fiber-reinforced polymer.

23. The method of claim 1, wherein the polymer is combined with the solid waste composition at a temperature less than about 70° C.

24. The method of claim 1, further comprising extruding the composite resin prior to reducing the composite resin to yield the plurality of particles.

25. The method of claim 1, wherein the polymer is heated prior to combining with the solid waste composition to form the composite resin.

26. The method of claim 1, wherein combining the polymer with the solid waste composition to form the composite resin comprises fusing at least a portion of the mixed plastics of the solid waste composition together with the polymer.

* * * * *